Figure 1:
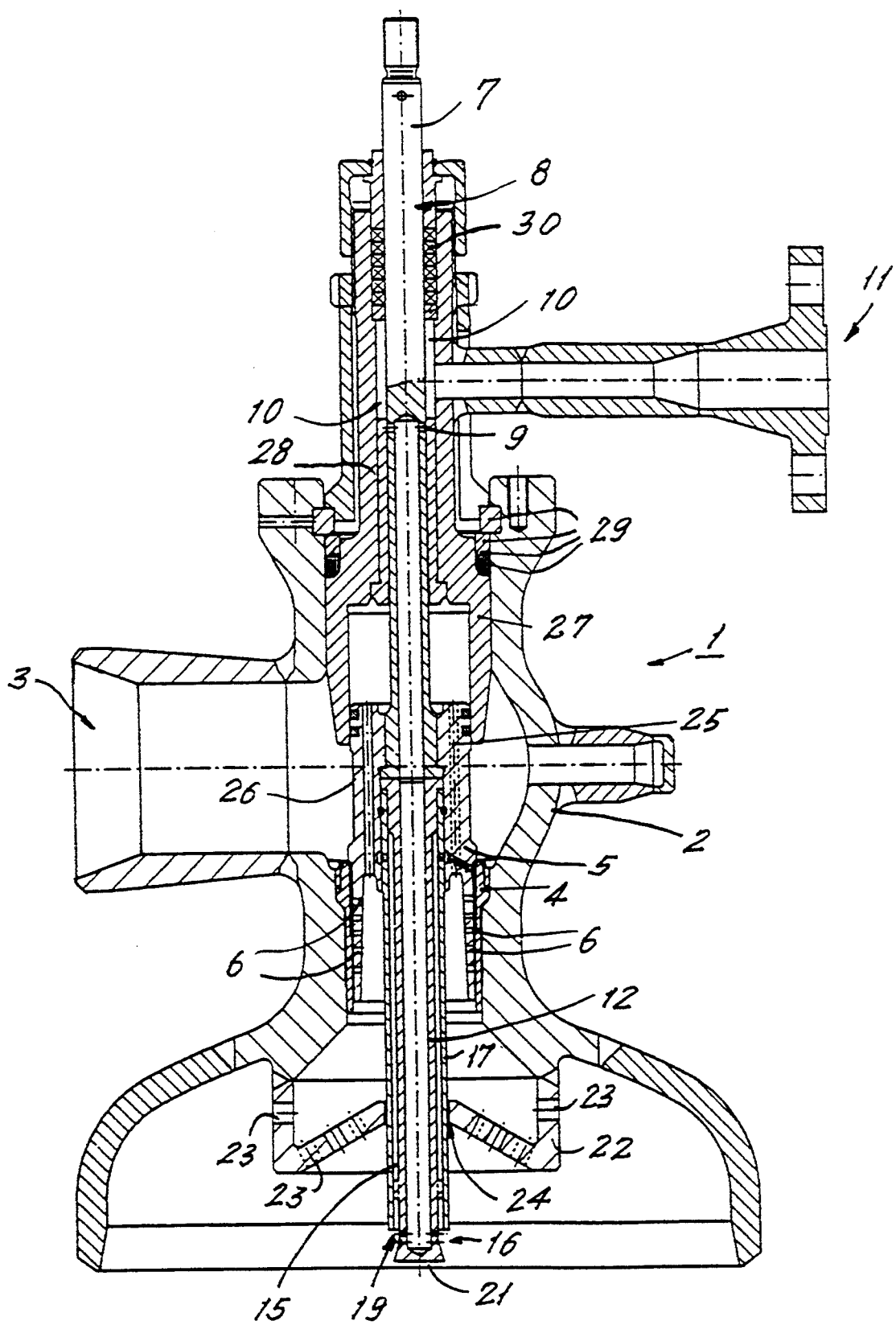

United States Patent [19]

Jacobsson

[11] Patent Number: 5,380,470
[45] Date of Patent: Jan. 10, 1995

[54] METHOD AND APPARATUS FOR REDUCING THE PRESSURE AND TEMPERATURE OF STEAM IN A STEAM CONDITIONING VALVE

[75] Inventor: Sven-Ake Jacobsson, Saffle, Sweden

[73] Assignee: BTG Källe Inventing AB, Saffle, Sweden

[21] Appl. No.: 167,810

[22] PCT Filed: Aug. 17, 1993

[86] PCT No.: PCT/SE93/00683
§ 371 Date: Dec. 16, 1993
§ 102(e) Date: Dec. 16, 1993

[87] PCT Pub. No.: WO94/04255
PCT Pub. Date: Mar. 3, 1994

[30] Foreign Application Priority Data

Aug. 26, 1992 [SE] Sweden .................. 9202454

[51] Int. Cl.⁶ ............................................. B01F 3/04
[52] U.S. Cl. ............................ 261/16; 261/DIG. 13; 261/50.3
[58] Field of Search ............... 261/DIG. 13, 16, 50.3

[56] References Cited

U.S. PATENT DOCUMENTS

| | | | |
|---|---|---|---|
| 1,256,853 | 2/1918 | Warner | 261/50.3 |
| 2,254,472 | 9/1941 | Dahl | 261/DIG. 13 |
| 2,355,458 | 8/1944 | Mastenbrook | 261/DIG. 13 |
| 3,134,827 | 5/1964 | Pontow et al. | 261/16 |
| 3,732,851 | 5/1973 | Self | 261/DIG. 13 |
| 4,011,287 | 3/1977 | Marley | 261/DIG. 13 |
| 4,071,586 | 1/1978 | Seger | 261/DIG. 13 |
| 4,505,865 | 3/1985 | Wullenkord | 261/DIG. 13 |

Primary Examiner—Tim Miles
Attorney, Agent, or Firm—Ostrolenk, Faber, Gerb & Soffen

[57] ABSTRACT

The invention relates to a method and apparatus for reducing steam pressure and temperature in a steam conditioning valve, in which steam flow is regulated with the aid of a valve plug (5) displaceably arranged in a valve seating (4), the plug being perforated by a plurality of holes (6), while cooling water is simultaneously taken into the upper portion (8) of the valve and is regulated in proportion to the regulation of process steam, said water being taken through a hollow valve spindle (7) passing through the plug (5) for discharge through a jet (12) downstream of the center of the departing steam flow. The plug (5) has at least one row of holes (14) in its central region (13). For small opening amounts of the valve (1) process steam is taken through at least one separate duct (15) up to and past the coolant outlet from its openings (16) such as to flow past and break up the coolant, which is ejected from the duct (15) in the vicinity of, and just above the coolant outlet openings (16).

4 Claims, 3 Drawing Sheets

METHOD AND APPARATUS FOR REDUCING THE PRESSURE AND TEMPERATURE OF STEAM IN A STEAM CONDITIONING VALVE

The present invention relates to a method and apparatus for reducing the pressure and temperature of steam in a steam conditioning valve, in which steam flow is regulated in a plug perforated by a plurality of holes, a greater or less number of holes being uncovered or closed off in response to the plug movement along a seating formed inside the valve, simultaneously as cooling water is taken into the upper part of the valve such as to be regulated with the aid of a water seat and a plurality of calibrated holes in a hollow valve spindle passing through the plug, and in proportion to regulation of the process steam, this cooling water then being taken through the hollow valve spindle for ejection via a jet downstream in relation to the center of the departing steam flow.

In previously known steam conditioning valves of a similar kind at present on the market, steam conditioning is achieved by spraying finely divided water or condensate into the downstream or low pressure side of the valve. The coolant is taken into the valve via a so-called water collar in the upper part of the valve, adjacent a yoke for the valve operating means, and subsequently into a hollow valve spindle through a plurality of holes in the upper part thereof, this part regulating the water supply. The spindle constitutes an integrated part of the valve plug itself. An outside cooling water regulating valve compensates for pressure and temperature variations in the coolant and also for temperature variations in the superheated steam.

The coolant or condensate is sprayed in downstream of the valve main seating through the hollow valve spindle and into the center of the steam flow, where the steam velocity is greatest, pressure low and turbulence very great. These factors contribute to an effective admixture of the coolant to the steam, resulting in rapid vapourisation. Downstream of the valve the steam velocity is reduced once again, and kinetic energy is converted to heat. This further contributes to rapid vapourisation of the coolant. The actual steam pressure regulation through the valve is performed with the aid of a plug, which is perforated by a large number of holes having different dimensions, thus achieving an optimum pressure regulation characteristic for the valve. The plug is guided by a seating, a greater or less number of these holes being uncovered or closed off to obtain regulation, depending on the position of the plug along the seating. However, it has been found with this type of valve that it is difficult to achieve fully satisfactory cooling for small increments of valve openings, i.e. those under 15-20%.

The object of the present invention is thus to provide a method and apparatus of the kind mentioned in the introduction, wherewith the above-mentioned drawbacks are mitigated. The distinguishing features of the invention are disclosed in the accompanying claims.

As a result of the invention the above-mentioned problem of leading steam to, and past the cooling water jet for small opening increments of the valve has been solved, hence substantially improving cooling due to the steam breaking up the cooling water jets into very small droplets. This also results in that the water is more easily vapourised, while cooling is made more effective.

Figure 2:
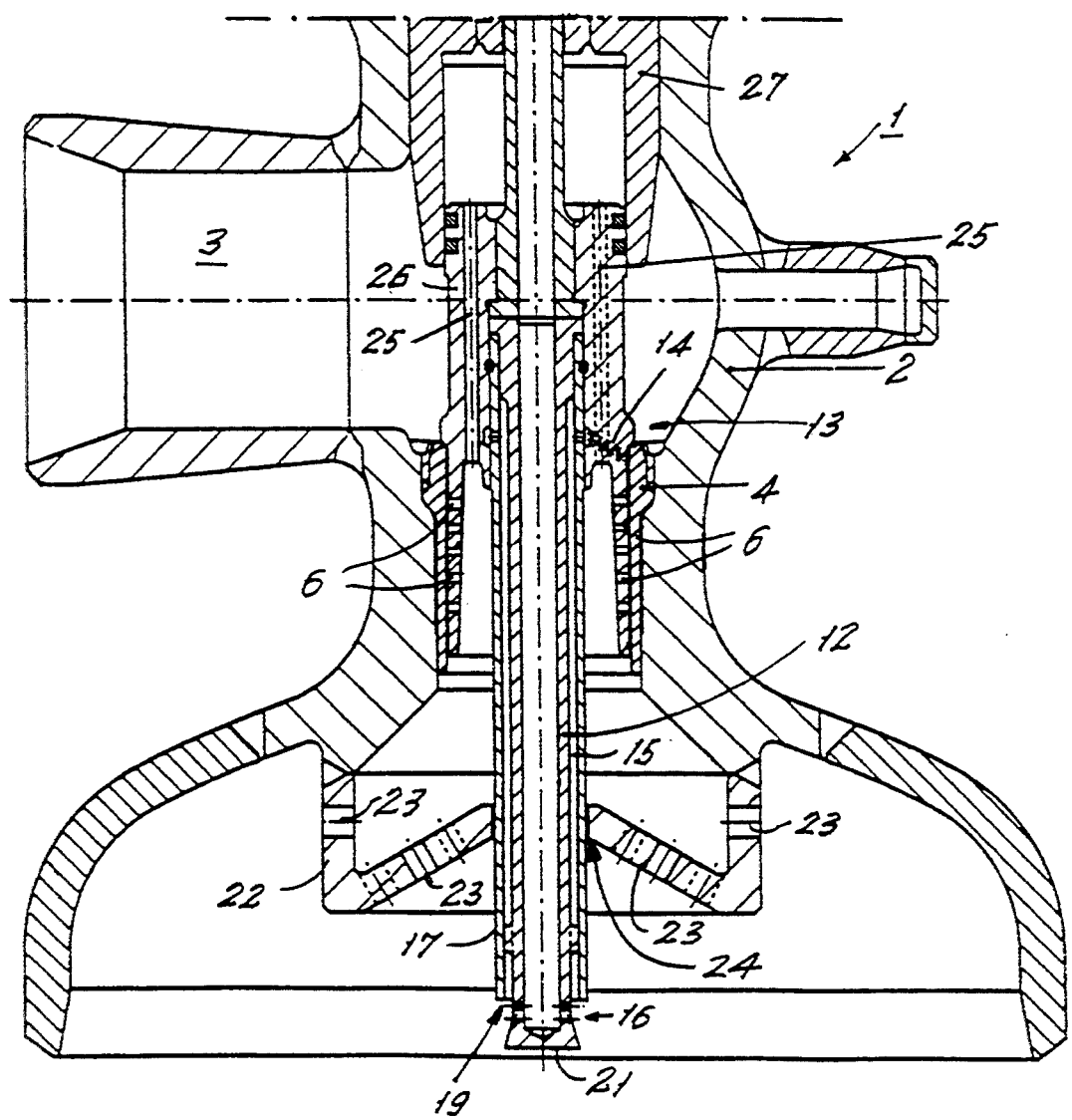
Figure 3:
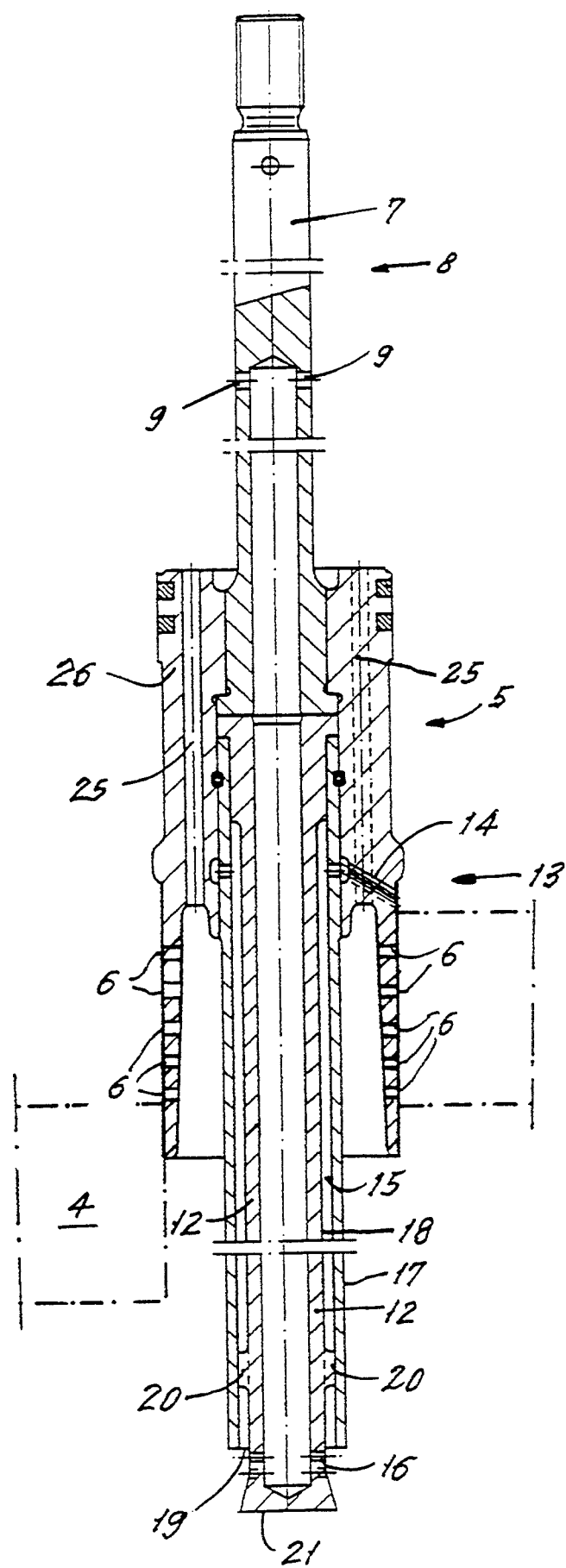

The invention will now be described in more detail with the aid of a preferred embodiment, and with reference to the accompanying drawings, where FIG. 1 is a schematic cross-section of a steam conditioning valve in accordance with the present invention, FIG. 2 is an enlargement of the lower part of the valve in FIG. 1, and FIG. 3 is an enlarged depiction of the valve plug illustrated in FIG. 1, and its integration with the valve spindle.

As will be seen from the drawings, the steam conditioning valve 1, in accordance with the preferred embodiment, includes a valve housing 2, into which process steam is taken via an inlet 3. Inside the housing 2 there is a valve seating 4, coacting with a plug 5, the lower, sleeve-like part of which is perforated by a plurality of holes 6 for regulating steam flow through the valve 1. Process steam regulation takes place in response to the position of the plug along the seating 4, along which the plug 5 is displaceable, such as to enable a greater or less number of holes to be uncovered. A hollow valve spindle 7 extends through the plug 5, the upper part of the spindle 8 having a plurality of calibrating holes 9, which coact with a water seat 10. A supply of cooling water to the spindle 7 via an inlet 11 is thus obtained, and will be proportional to the regulation of process steam caused by the movement of the plug 5 along the valve seating 4. Inside the plug 5 the spindle 7 forms into a nozzle or jet 12 in the region of its calibrated holes 6, this jet extending downward in the Figs, and past the plug 5 to open out downstream of the center of the departing steam. The spindle 7 is preferably in one piece with the plug 5 and jet 12. The spindle is actuated with the aid of an operating means not illustrated on the drawing.

In its intermediate region 13 and above the holes 6 the plug 5 is provided with at least one row of holes 14, which, for small opening increments of the valve, give the process steam access to at least one separate duct 15. The steam exits from the duct 15 in the vicinity of, and above the coolant outlet openings 16 of the jet 12 such as to flow past and break up the ejected coolant. In the illustrated, preferred embodiment example the duct 15 is annular and formed between the curved surface 18 of the jet 12, such as to extend along the curved surface 18 and exit at an annular outlet 19, situated above the outlet/openings 16 of the jet. Spacers 20 are arranged between the jet and jacket in the vicinity of the outlet 19 to prevent vibration of the jacket 17. In the illustrated embodiment there may be between 4 and 8, of the holes 14, which open out into the annular gap forming the duct 15.

As will be seen from the drawings, the outlet holes 16 of the cooling water jet 12 are at an angle of about 90° to the longitudinal direction of the jet. Accordingly, the process steam flow crosses the cooling water discharge, the steam thus breaking down into very small droplets the jets of water forming the discharge. Since the outward end 21 of the jet 12 is cut off sharply and transversely, water droplets are prevented from adhering to it. This end may also have an increased diameter, thus forming the base of a conical surface starting immediately downstream of the outlet openings 16, which favourably affects the admixture of the coolant into the steam.

In the embodiment example illustrated on the drawing of the valve 1 in accordance with the invention, it is provided with a silencer 22, centrally arranged under the plug 5 after the outlet of the main process steam flow for large opening amounts, but before the discharge flow of both coolant and the process steam flowing through the valve for small opening increments, i.e. steam through the annular duct 15. The silencer 22 has a plurality of through holes 23 and a large central hole 24 accommodating the lower part of the jet 12. In the applications where the valve is provided with silencing, the implementation in accordance with the present invention has been found particularly suitable for valve function.

In the majority of applications it is advantageous for a plurality of balancing ducts 25 to be formed in the upper part 26 of the plug body, so that they extend axially through the plug 5. There is thus obtained the same pressure both above and below the plug. This permits, inter alia, the use of a smaller operating means for actuating the plug, thus favourably affecting the price of the valve, as well as precision in setting. There is a sleeve-like cap 27 inside the valve housing 2 for guiding the upper part 26 of the plug 5, this cap also being provided with guidance 28 for the valve spindle 7. The cap 27 is sealed against the valve housing 2 by an autoclave seal 29, and the spindle 7 is in turn sealed against the cap by a packing gland 30.

The inventive valve functions as will now be described. From the drawings it will be seen that for small valve opening increments, i.e. when all the holes 6 are covered by the seating 4', see FIG. 3, process steam is fed in through the holes 14 to the annular duct 15. This steam is subsequently taken downwards through the duct 15 to its outlet 19, where it practically immediately comes into contact with, and breaks up the cooling water, which, with the aid of the water seat 10, is fed in proportion to the flow of process steam, this water flowing out through the outlet openings 16 of the jet 12. By causing the steam to impinge in this way on the jets of cooling water flowing from the outlet openings 16, a very effective breakdown into droplets is accomplished, as well as easier vapourisation of the cooling water and improvement of steam cooling.

I claim:

1. Method of reducing the pressure and temperatures of steam in a steam conditioning valve (1), in which steam flow is regulated by a plug (5) perforated by a plurality of holes (6), such that a greater or less number of holes (6) being uncovered or closed off in response to movement of the plug (5) along a seating (4) formed inside the valve (1), cooling water being simultaneously taken into the upper part (8) of the valve and regulated with the aid of a water seat (10) and a plurality of calibrated holes (9) in a hollow valve spindle (7) passing through the plug (5), this regulation being proportional to that of the process steam, the cooling water then being taken through the hollow valve spindle (7) for spraying out and through a jet (12) in the center of the departing steam flow, characterized in that for small opening amounts of the valve (1) process steam is taken directly to the vicinity of the outlet openings (16) of the jet (12) and the cooling water sprayed out therefrom, such as to break up this water by the process steam being caused to impinge on the sprayed-out water simultaneously as partial vapourisation of the water is achieved and process steam cooling is improved.

2. Method as claimed in claim 1, characterized in that process steam is taken into an annular space (15) surrounding the jet (12) and is caused to flow from the outlet (19) of this space (15), said outlet being situated immediately above the outlet openings (16) of the cooling water, which is ejected substantially transverse the axial direction of the hollow valve spindle (7), whereby the process steam with its entire unreduced pressure cuts across the direction of the cooling water flow such as to break up the water.

3. Apparatus for reducing steam pressure and temperature in a steam conditioning valve (1), including a plug (5) coacting with a seating arranged in a valve housing (2), the plug being perforated by a plurality of holes (6) for regulating steam flow through the valve (1), a hollow valve spindle (7) passing through the plug and having at its upper portion (8) a plurality of calibrated holes (9) for coaction with a water seat (10) for feeding cooling water into the hollow spindle (7) in proportion to regulation of the steam, said cooling water flowing through a jet (12) extending downwardly below the plug (5) to exit at the center of the departing steam flow, characterized in that the plug (5) has in its central region (13) above the holes (6) at least one row of holes (14) adapted such that for small amounts of valve openings they lead process steam to at least one separate duct (15) taking the steam to the vicinity of outlet openings (16) for the cooling water in the jet (12).

4. Apparatus as claimed in claim 3, characterized in that the separate duct (15) is annular and delimited radially outwardly by a tubular jacket (17) concentric with the jet (12) and extending downwardly along the curved surface (18) of the jet such as to provide an annular outlet (19) above the outlet openings (16).

* * * * *